(12) United States Patent
Kanno et al.

(10) Patent No.: US 8,200,724 B2
(45) Date of Patent: Jun. 12, 2012

(54) COMMUNICATION TERMINAL, TRANSMISSION METHOD, AND TRANSMISSION SYSTEM

(75) Inventors: Manabu Kanno, Chiba (JP); Tetsuya Naruse, Kanagawa (JP)

(73) Assignee: Sony Mobile Communications Japan, Inc., Tokyo (JP)

( * ) Notice: Subject to any disclaimer, the term of this patent is extended or adjusted under 35 U.S.C. 154(b) by 297 days.

(21) Appl. No.: 12/712,539

(22) Filed: Feb. 25, 2010

(65) Prior Publication Data

US 2010/0228755 A1 Sep. 9, 2010

(30) Foreign Application Priority Data

Mar. 6, 2009 (JP) ................ P2009-054207

(51) Int. Cl.
*G06F 17/30* (2006.01)
(52) U.S. Cl. ......... 707/828; 707/736; 707/758; 707/679
(58) Field of Classification Search .................. 707/679, 707/736, 758, 828
See application file for complete search history.

(56) References Cited

U.S. PATENT DOCUMENTS

| | | | |
|---|---|---|---|
| 7,558,789 B2 * | 7/2009 | Frieder et al. ................ | 1/1 |
| 2006/0004600 A1 * | 1/2006 | Summer et al. ................ | 705/1 |
| 2006/0080103 A1 * | 4/2006 | Van Breemen ............... | 704/270 |
| 2007/0010195 A1 | 1/2007 | Brown et al. | |
| 2008/0240702 A1 | 10/2008 | Wassingbo et al. | |
| 2010/0107104 A1 * | 4/2010 | Bruce et al. ................ | 715/772 |

FOREIGN PATENT DOCUMENTS

| | | |
|---|---|---|
| EP | 1 981 213 | 10/2008 |
| EP | 2 023 583 | 2/2009 |
| JP | 2008 52737 | 3/2008 |
| WO | WO 2005 078613 | 8/2005 |

OTHER PUBLICATIONS

Search Report issued in corresponding European Application No. 10250297.8.

* cited by examiner

*Primary Examiner* — Cheryl Lewis
(74) *Attorney, Agent, or Firm* — Frommer Lawrence & Haug LLP; William S. Frommer

(57) ABSTRACT

A communication terminal includes a first storage section configured to store address information for performing connection to a communication terminal of a communication partner and an address book containing information about the communication partner, a second storage section configured to store first data files, a search section configured to search through the second storage section for first data files corresponding to information about the communication partner linked to the communication terminal of the communication partner selected on the basis of the address book, a compiling section configured to compile the retrieved first data files into a predetermined unit to generate a second data file, and a communication section configured to perform communication between the present communication terminal and the communication terminal of the communication partner and transmit the second data file to the communication terminal of the communication partner.

6 Claims, 7 Drawing Sheets

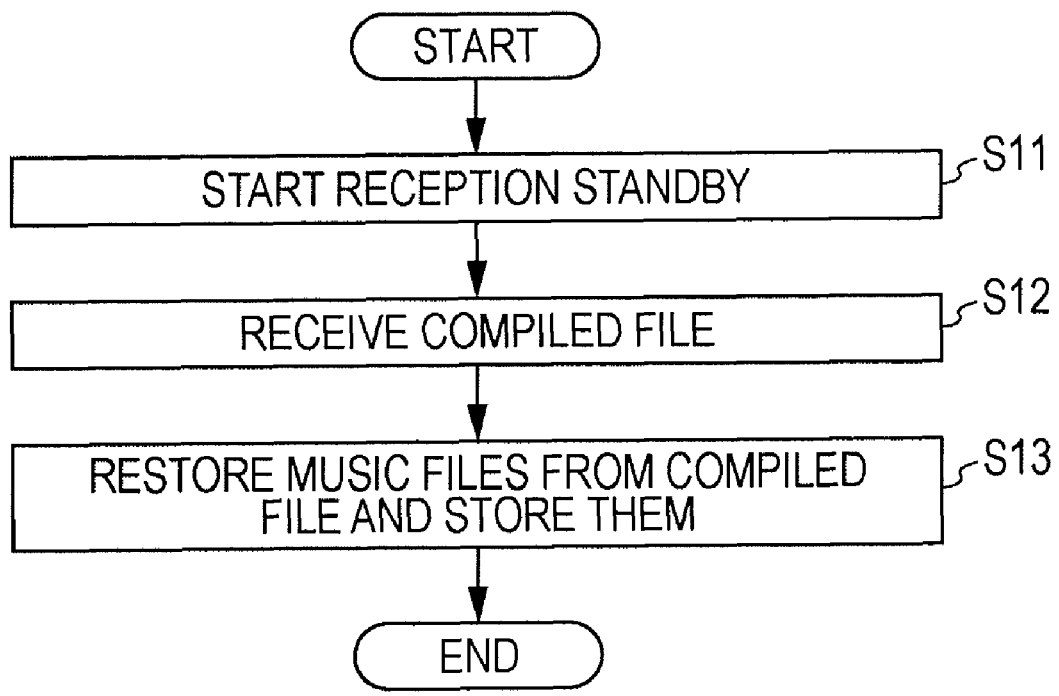

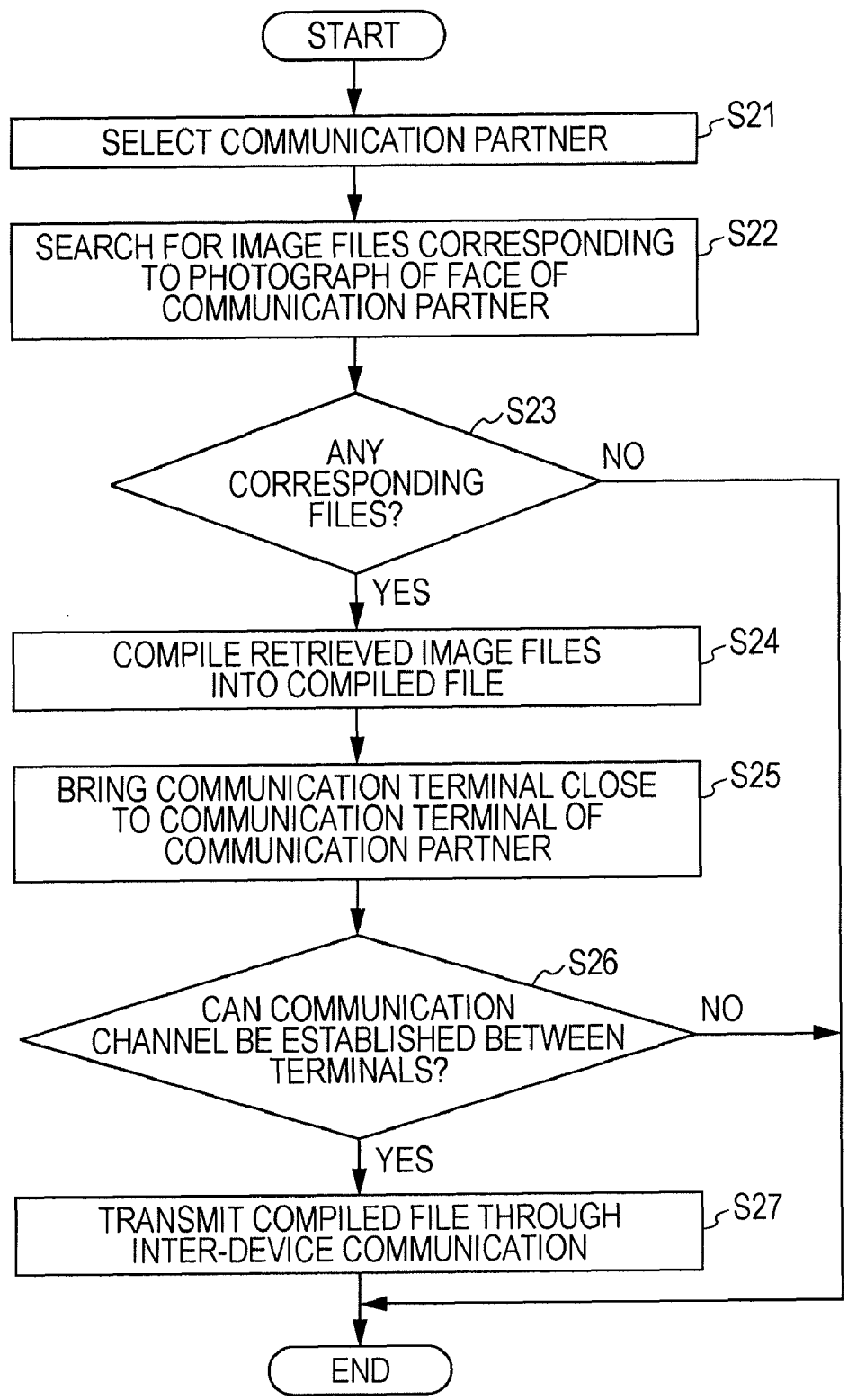

COMMUNICATION TERMINAL, TRANSMISSION METHOD, AND TRANSMISSION SYSTEM

BACKGROUND OF THE INVENTION

1. Field of the Invention

The present invention relates to a communication terminal, a transmission method, and a transmission system that are suitable for being applied to, for example, transmission of a large number of data files between terminals.

2. Description of the Related Art

In recent years, there have been a growing number of users who purchase a large number of music files and carry the files in communication terminals such as mobile phones in order to listen to the pieces of music by using the communication terminals. In addition, there have been a growing number of occasions for the users to exchange data files (such as music files and image files) with other users through various types of short-range inter-device communication (such as infrared communication and Bluetooth (registered trademark)).

Japanese Unexamined Patent Application Publication No. 2008-52737 discloses a technology for providing a user with information about pieces of music that match music request information provided by the user.

SUMMARY OF THE INVENTION

Because of the slow speed of short-range inter-device communication used by communication terminals of the related art, applications that perform transmission/reception for each data file have been used in communication. However, when a large number of data files are transmitted/received using such an application, an overhead associated with the transmission/reception is increased as the number of data files is increased, reducing the efficiency of the transmission/reception. In addition, when a user retrieves data files stored in the communication terminal, the user has to manually select individual data files. Therefore, it takes effort to select data files and time to complete transmission of all the retrieved data files to a communication terminal of a communication partner.

Accordingly, it is desirable to perform transfer of data files efficiently between communication terminals.

In an embodiment of the present invention, predetermined processing is performed on the basis of information that is read from a first storage section storing address information for performing connection to a communication terminal of a communication partner and storing an address book containing information about the communication partner, and information that is read from a second storage section storing first data files.

In this processing, the second storage section is searched through for first data files corresponding to the information about the communication partner linked to the communication terminal of the selected communication partner.

Then, after a second data file is generated by compiling the retrieved first data files into a predetermined unit, communication is established between the present communication terminal and the communication terminal of the communication partner, and the second data file is transmitted to the communication terminal of the communication partner.

This makes it possible to compile the first data files retrieved in accordance with the information about the communication partner into the second data file and transmit the second data file to the communication terminal of the communication partner.

According to an embodiment of the present invention, first data files can be extracted in accordance with the information about the communication partner and compiled into a single second data file, and the second data file can be transmitted to the communication terminal of the communication partner by using short-range wireless communication. This saves the user the effort of having to individually select first data files stored in the terminal of the user and enables efficient transmission of data files between the communication terminals.

BRIEF DESCRIPTION OF THE DRAWINGS

FIG. 6 is a flowchart illustrating an example of processing of music file reception according to the embodiment of the present invention; and FIG. 7 is a flowchart illustrating an example of processing of image file transmission according to a modification of the present invention.

DESCRIPTION OF THE PREFERRED EMBODIMENTS

The following are descriptions of a preferred embodiment (hereinafter referred to as the embodiment) for carrying out the present invention. Note that the descriptions are provided in the following order.

1. Embodiment (control of data file transfer: example of transferring music files)
2. Modification

1. Embodiment

Example of Transmission System

The embodiment of the present invention will be described with reference to FIGS. 1 to 6. This embodiment describes an example where the embodiment is applied to a transmission system 10 in which large data files are exchanged between communication terminals by using wireless communication.

Figure 1:
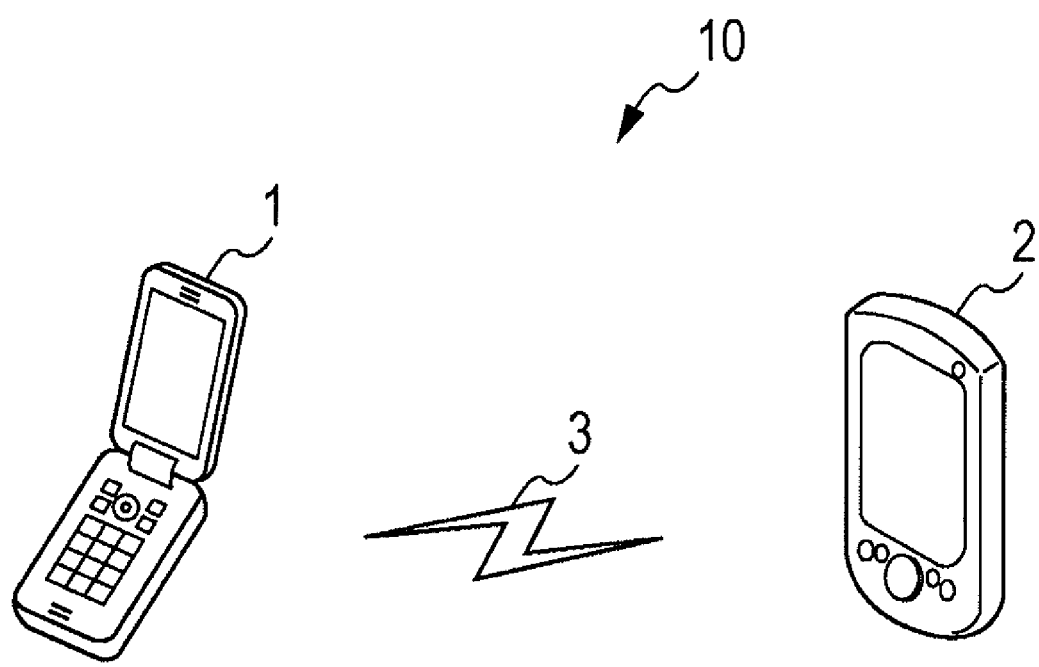
FIG. 1 is an explanatory diagram illustrating an example of a configuration of a transmission system according to an embodiment of the present invention.

FIG. 1 illustrates an example of a configuration of the transmission system 10.

In an example of the present embodiment (hereinafter referred to as the present example), the transmission system 10 includes a first communication terminal 1 that establishes a connection to a base station through a wireless telephone line by using various wireless communication methods and performs wireless communication with the base station. The transmission system 10 also includes a second communication terminal 2 that receives data files from the first communication terminal 1 through a wireless communication channel 3 that is established in accordance with a predetermined communication method. The chassis of the first communication terminal 1 and the second communication terminal 2 are configured to be small enough that the users can carry them around all the time. In addition, the first communication terminal 1 and the second communication terminal 2 use a built-in battery (not shown) as a power source.

Examples of the wireless communication method used between the first communication terminal 1 and the base station include a code division multiple access (CDMA) method. Examples of the data files that the first communication terminal 1 transmits to the second communication terminal 2 include a music file (first data file) which has been compressed by using a Moving Picture Experts Group audio layer 3 (MP3) format and subjected to sound quality analysis. The wireless communication channel 3 is established by using a technology capable of performing wireless communication at short range, such as Bluetooth (registered trademark) or TransferJet (registered trademark).

[Example of Internal Configuration of First Communication Terminal]

Figure 2:
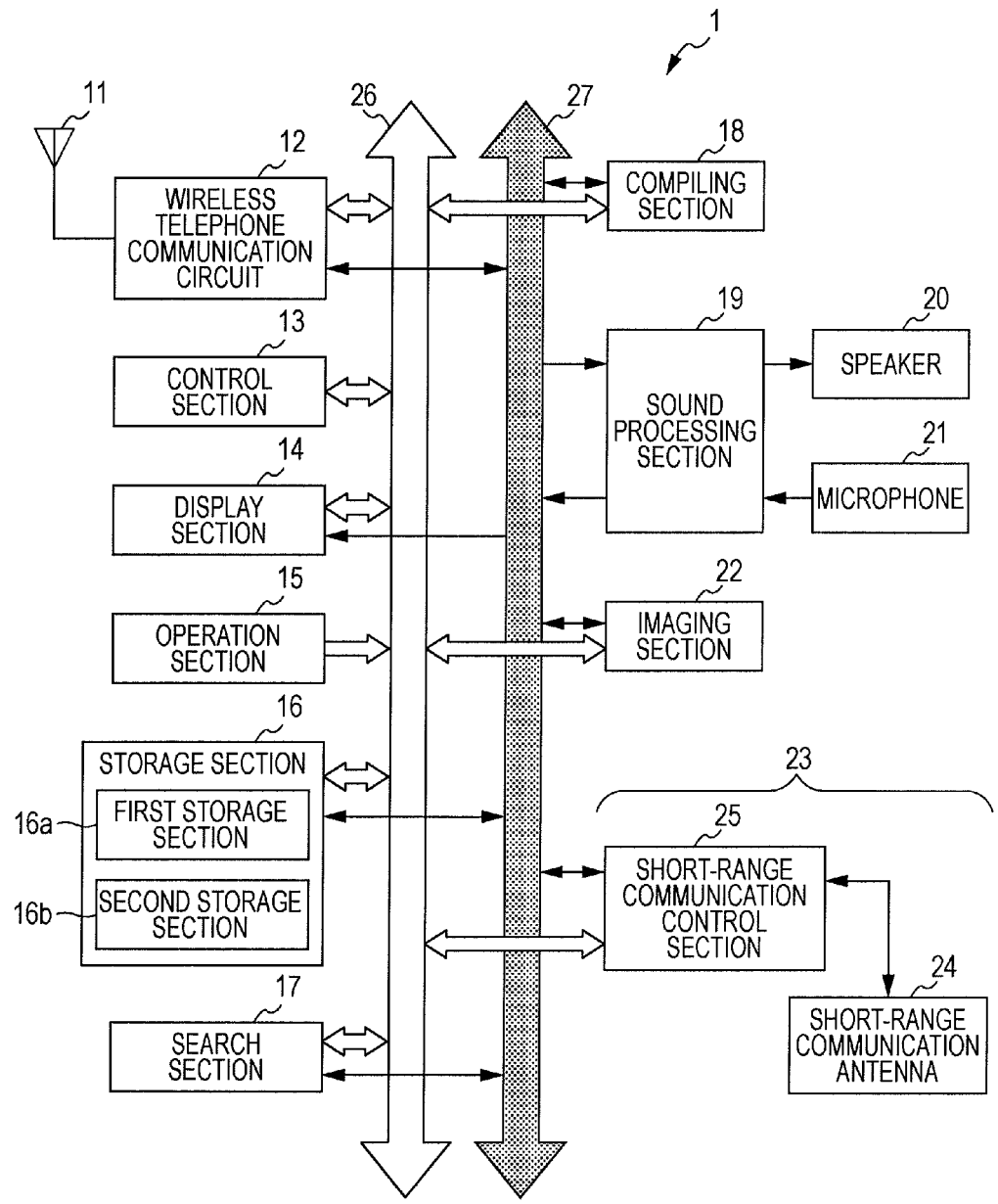
FIG. 2 is a block diagram illustrating an example of an internal configuration of a first communication terminal according to the embodiment of the present invention.

FIG. 2 illustrates an example of an internal configuration of the first communication terminal 1.

The first communication terminal 1 includes an antenna 11, a wireless telephone communication circuit 12 that is a wireless communication section for performing wireless communication with a base station for wireless telephones, and a control section 13 that controls individual sections. The antenna 11 is connected to the wireless telephone communication circuit 12. The control section 13 of the first communication terminal 1 controls wireless communication performed by the wireless telephone communication circuit 12 so as to serve as a communication control section. The control section 13 also controls processing such as a wireless connection with the base station. The control section 13 further exchanges control data with the individual sections in the first communication terminal 1 through a control line 26 so as to control other functions, in addition to wireless communication, in the terminal.

When a packet received by the wireless telephone communication circuit 12 includes sound data, the control section 13 extracts the sound data from the packet and supplies the sound data to a sound processing section 19 through a data line 27. The sound processing section 19 demodulates the sound data into analog sound signals and supplies the demodulated analog sound signals to a speaker 20 to output the sound.

The first communication terminal 1 further includes a microphone 21 through which sound is input. The sound processing section 19 modulates analog sound signals which have been generated by the microphone 21 from sounds collected thereby into sound data for transmission, and supplies the modulated sound data to the wireless telephone communication circuit 12. The wireless telephone communication circuit 12 places the supplied sound data in a packet to be transmitted to the base station and transmits the packet thereto through wireless communication.

The first communication terminal 1 also includes an imaging section 22 including an optical system, an image pickup device, etc. An image captured by the imaging section 22 is transmitted to a second storage section 16b (to be described later) through the data line 27 and stored therein.

The first communication terminal 1 further includes a display section 14 composed of a liquid crystal display panel or the like. The display section 14 displays various pieces of information under control of the control section 13. Examples of information to be displayed on the display section 14 are information on incoming and outgoing calls, information registered in a phonebook or an address book, incoming and outgoing mails, images downloaded through the Internet, contents of the address book, names of music files, and images captured by the imaging section 22.

The first communication terminal 1 further includes an operation section 15 with which the user performs operations. The control section 13 performs various processes in response to operations performed using the operation section 15. For example, transmission using wireless telephone communication, transmission or reception of mails, or starting or termination of data communication such as accessing the Internet will be executed when a corresponding key or the like provided in the operation section 15 is operated.

In addition, the first communication terminal 1 includes a storage section 16 composed of a flash memory or the like. The storage section 16 is connected to the control line 26 and the data line 27, and stores data such as that received from an external source. The storage section 16 also stores programs necessary for the control section 13 to perform control processing and attribute information as information about the user of the first communication terminal 1.

In the present example, the storage section 16 includes two storage sections; a first storage section 16a and a second storage section 16b. The first storage section 16a stores address information for performing connection to the communication terminal of the communication partner (second communication terminal 2) and an address book containing the information about the communication partner. The second storage section 16b stores music files. The information about the communication partner using the second communication terminal 2 stored in the address book of the first storage section 16a includes information about the preferences of the communication partner. Music files, images files and the like are stored in the second storage section 16b.

The first communication terminal 1 includes a search section 17 that searches through the second storage section 16b for music files having been subjected to sound quality analysis in advance and corresponding to the music preference information linked to the communication terminal of the communication partner selected on the basis of the address book. The music preference information contains information about music that the communication partner prefers (such as reggae or rock).

The first communication terminal 1 also includes a compiling section 18 that compiles and compresses the retrieved music files into a predetermined unit in an application layer to generate a compiled file (second data file). The compiled file is composed of an index file used to manage the number of the retrieved music files or the like, and an entity file into which the music files themselves have been converted.

The first communication terminal 1 further includes a short-range communication section 23 that establishes the wireless communication channel 3 with the second communication terminal 2 and performs short-range wireless communication therewith. The short-range communication section 23 includes a short-range communication antenna 24 that transmits the compiled file to the second communication terminal 2 through wireless communication and a short-range communication control section 25 that controls the output power and operations of the short-range communication antenna 24.

The short-range communication section 23 establishes the wireless communication channel 3 when the short-range communication section 23 recognizes that the first communication terminal 1 has been brought close to the second communication terminal 2, and transmits the compiled file to the second communication terminal 2.

[Example of Internal Configuration of Second Communication Terminal]

Figure 3:
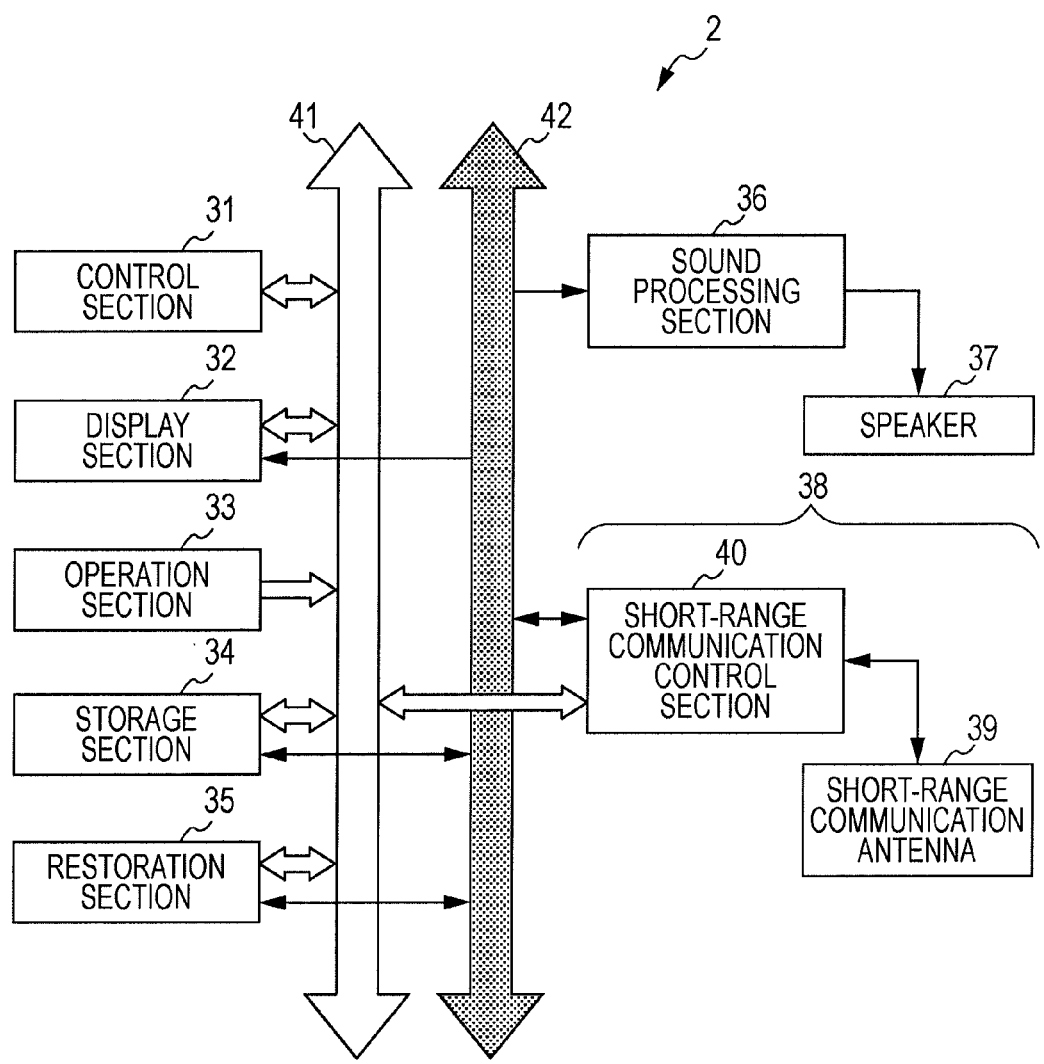
FIG. 3 is a block diagram illustrating an example of an internal configuration of a second communication terminal according to the embodiment of the present invention.

FIG. 3 illustrates an example of an internal configuration of the second communication terminal 2.

The second communication terminal 2 includes a control section 31 that controls processing of individual sections and a display section 32 composed of a liquid-crystal display panel or the like. The display section 32 displays various pieces of information under control of the control section 31. The second communication terminal 2 includes an operation section 33. The control section 31 performs various processes in response to operations performed using the operation section 33.

In addition, the second communication terminal 2 includes a storage section 34 composed of a flash memory or the like. The storage section 34 is connected to a control line 41 and a data line 42, and stores data such as that received from an external source. The storage section 34 also stores programs necessary for the control section 31 to perform control processing.

The second communication terminal 2 includes a restoration section 35 that decompresses the compiled file received from the first communication terminal 1 to restore the music files. The music files restored by the restoration section 35 are stored in the storage section 34. The second communication terminal 2 also includes a sound processing section 36 that reads the music files from the storage section 34 through the data line 42 and demodulates the music files into analog sound signals, and a speaker 37 that outputs the sound using the demodulated analog sound signals.

The second communication terminal 2 further includes a short-range communication section 38 that establishes the wireless communication channel 3 with the first communication terminal 1 and performs short-range wireless communication therewith. The short-range communication section 38 includes a short-range communication antenna 39 that receives the compiled file from the first communication terminal 1 through wireless communication and a short-range communication control section 40 that converts the received compiled file into the music files.

The short-range communication section 38 establishes the wireless communication channel 3 when the short-range communication section 38 recognizes that the first communication terminal 1 has been brought close to the second communication terminal 2, and receives the compiled file from the first communication terminal 1.

Figure 4:
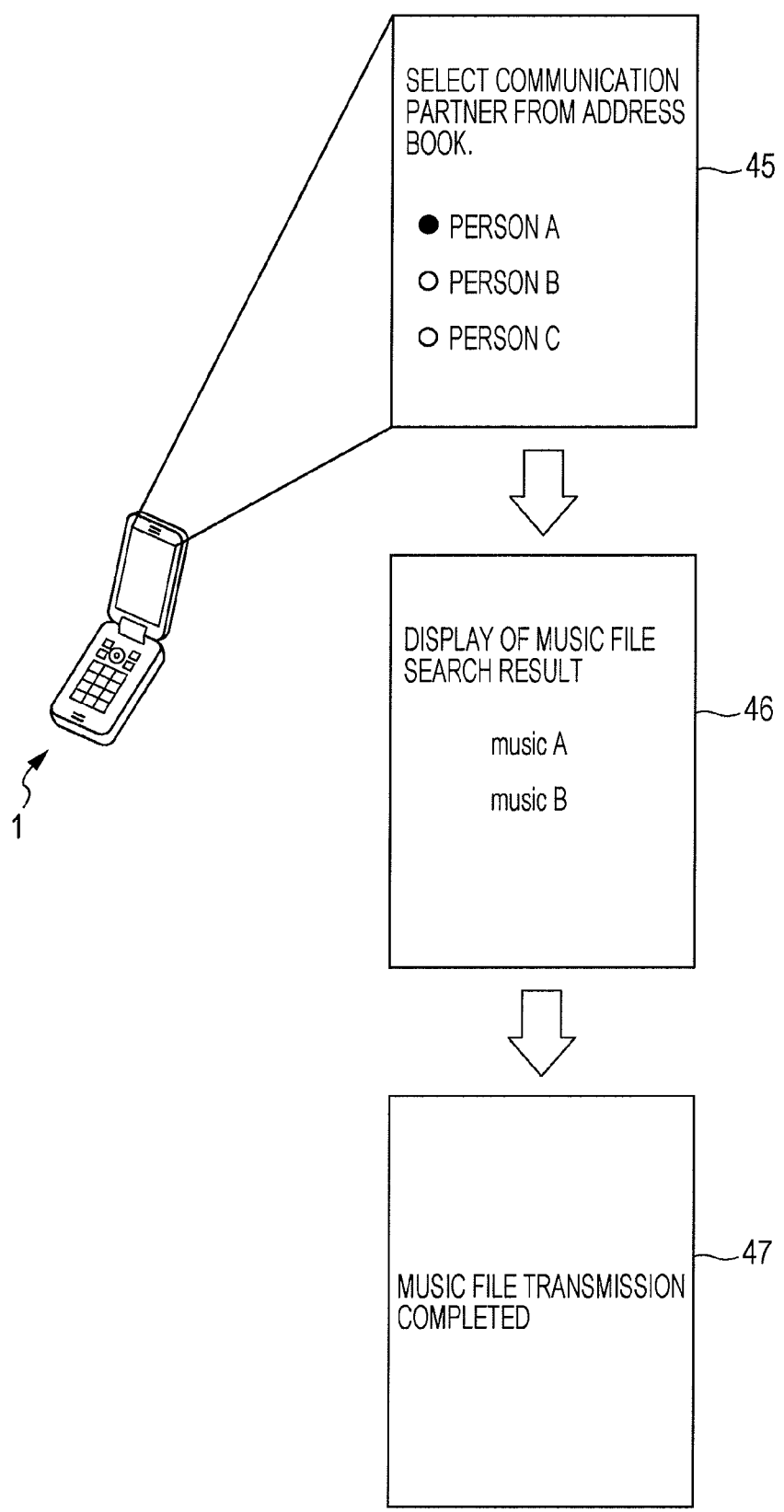
FIG. 4 is an explanatory diagram illustrating an example of a screen transition of the first communication terminal according to the embodiment of the present invention.

FIG. 4 illustrates an example of a user interface screen to be displayed on the display section 14 when the first communication terminal 1 transmits the music files.

The first communication terminal 1 uses an application for transmitting and receiving music files between terminals. This application has the following functions:

A search function that adds attribute information to a phonebook/address book held in the first communication terminal 1 and searches through music files on the basis of this information.

A transmitting and receiving function that adopts a high-speed short-range inter-device communication method (such as TransferJet (registered trademark), which enables a maximum transmission rate of 560 Mbps) and converts music files into a format suitable for the communication method in order to perform transmitting and receiving operations.

When the user operates the first communication terminal 1 to select a file transmission menu (not shown), a communication partner selection screen 45 for selecting a communication partner is displayed on the display section 14. The communication partner selection screen 45 is displayed in association with the phonebook/address book. In the present example, it is assumed that the user selects a "person A" and transmits music files to the "person A".

Then, the first communication terminal 1 searches for music files that the "person A" may prefer through the first storage section 16a and displays a search result display screen 46 indicating a list of the search results on the display section 14. This searching is automatically performed on the basis of the music preference information of the "person A" which has been registered in advance in the phonebook/address book. Then, when transmission of the music files to the second communication terminal 2 that the "person A" uses is completed, a message 47 indicating the completion of the music file transmission is displayed on the display section 14. From this message, the user can be aware that the transmission of the music files has been completed.

Figure 5:
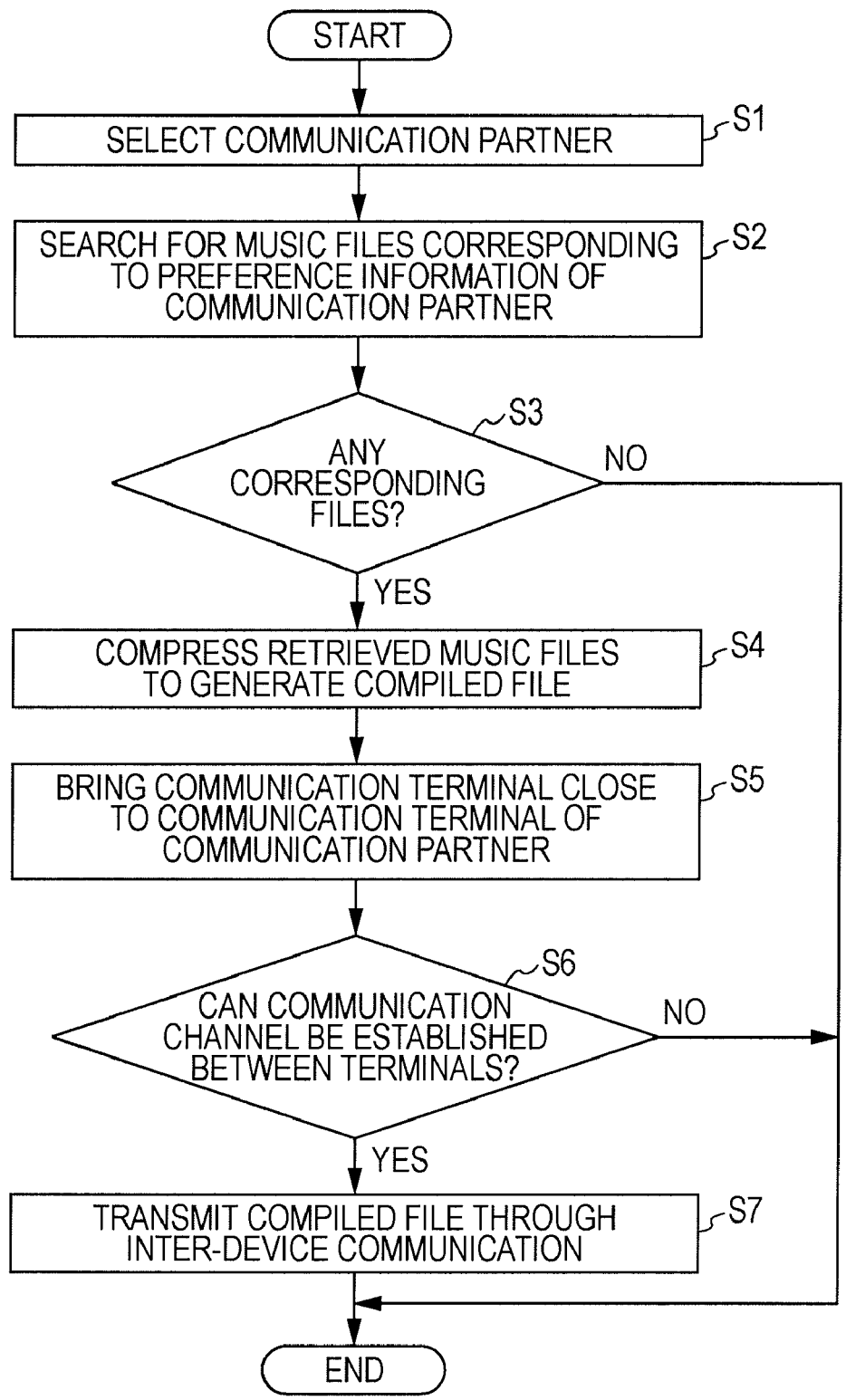
FIG. 5 is a flowchart illustrating an example of processing of music file transmission according to the embodiment of the present invention.

FIG. 5 illustrates an example of processing of music file transmission of the first communication terminal 1 to the second communication terminal 2.

As a preliminary step, the control section 13 analyzes the sound quality of music files in advance when the first communication terminal 1 retrieves the music files.

The sound quality analysis is processing that identifies the genre and the tempo for each music file and is performed by the control section 13 when the second storage section 16b stores the music file.

Each music file is provided with metadata containing a numerical value indicating the tempo of the piece of music, a numerical value indicating the brightness of the piece of music, a numerical value indicating the liveliness of the piece of music, information indicating whether the piece of music is live music or not, a numerical value indicating the era when the piece of music was released, information indicating the genre of the piece of music, etc.

The search section 17 can search for music files according to the music preference information of the communication partner by using a search expression that expresses a search condition represented by feature quantities of pieces of music subjected to the search and combinations thereof. In the case where pieces of music are searched by selecting the types of metadata and the ranges of values for the types of metadata in a feature quantity space which is represented by metadata indicated by numerical values, the search expression expresses the types of metadata and the range of values of each type of metadata. In the case where a predetermined piece of music is used as a search key to search pieces of music having metadata similar to that of the piece of music of the search key, the search expression expresses the metadata of the piece of key music used as a search key and the similarity thresholds thereof.

In this case, the degree of similarity between the metadata of the piece of key music and the metadata of each of all the other pieces of music subjected to the search is calculated from a resulting distance between the metadata of the piece of key music and the metadata of each of the other pieces of music obtained by using Euclidean distance, which represents the distance as a distance between two points in a vector space, Mahalanobis distance, which represents the distance while taking into account the distribution of multiple pieces of metadata of the piece of key music, or a distance function such as Kullback-Leibler divergence (KL distance), which represents the distance as a distance between two probability distributions. That is, the smaller the distance between the key music metadata and the other music metadata, the greater the degree of similarity between them.

<Registration of Music Preference Information in Attribution Information of Phonebook/Address Book>

The user who operates the first communication terminal 1 registers in advance music preference information necessary for searching in the phonebook/address book stored in the first storage section 16a as one of pieces of the attribution information of the phonebook/address book.

<From Selection of Communication Partner to Searching of Music Files>

The user selects a communication partner from the phonebook/address book of the first communication terminal 1 while viewing the communication partner selection screen 45 displayed on the display section 14 (step S1). The search section 17 searches the second storage section 16b for music files, which have been subjected to sound quality analysis, corresponding to the music preference information of the communication partner which has been registered in advance (step S2).

Next, the search section 17 determines whether the corresponding music files exist in the second storage section 16b (step S3). If there are no corresponding music files, the processing is terminated. If there are corresponding music files, the compiling section 18 compiles and compresses the retrieved music files into a single file to generate a compiled file (step S4).

<Transmission of Music Files>

Then, the user brings the first communication terminal 1 close to the second communication terminal 2 (step S5). Subsequently, the short-range communication section 23 determines whether or not the wireless communication channel 3 can be established with the second communication terminal 2 (step S6). If the short-range communication section 23 is not able to establish the wireless communication channel 3, the short-range communication section 23 terminates the transmission processing.

On the other hand, if the short-range communication section 23 establishes the wireless communication channel 3, the short-range communication section 23 transmits the compiled file by using inter-device communication (step S7). When the short-range communication section 23 completes the transmission of the compiled file, a message indicating that the transmission has been completed is displayed on the display section 14.

<Reception of Music Files>

FIG. 6 illustrates an example of processing of music file reception of the second communication terminal 2.

First, the second communication terminal 2 starts a standby process for receiving the music files (step S11). Next, when the wireless communication channel 3 is established, the short-range communication section 38 receives the compiled file from the first communication terminal 1 (step S12).

Then, the restoration section 35 decompresses the received compiled file and restores the music files from the compiled file by using software that performs decompression of compiled files, and then stores the restored music files in the storage section 34 (step S13). Then the second communication terminal 2 terminates the reception processing.

The user of the first communication terminal 1 according to the present embodiment described above selects the communication partner from the phonebook/address book of the first communication terminal 1. With this selection as a trigger, the search section 17 searches for the music files, which have been subjected to sound quality analysis, corresponding to the music preference information of the communication partner. After the compiling section 18 generates the compiled file, the short-range communication section 23 transmits the compiled file to the second communication terminal 2. Therefore, there is an advantage in that the user does not have to search for individual music files in the first communication terminal 1 for the communication partner that uses the second communication terminal 2. There is another advantage in that an easier and faster operation for transmitting music files can be realized since searching of music files can be performed automatically in accordance with the music preference information of the communication partner. There is still another advantage in that easier transmission of data files can be realized by using the short-range communication section 23.

2. Modification

Although, in the transmission system 10 according to the above-described embodiment, short-range wireless communication is used by the short-range communication section 23 in order to transmit and receive a compiled file, wired communication using a cable (for example, a USB cable) may be also used. Alternatively, in the transmission system 10, the wireless communication channel 3 may be established by using a wireless communication standard such as IEEE 802.11g.

In the above-described description, an example has been given in which the first communication terminal 1 transmits music files that have been compiled into a compiled file to the second communication terminal 2. However, instead of music files, image files containing images of the face of a communication partner may be compiled into a compiled file. In this case, the information about the communication partner to be stored in the address book of the first storage section 16a is facial information of a communication partner that uses the second communication terminal 2. Examples of data files to be transmitted from the first communication terminal 1 to the second communication terminal 2 include image files (first data file) that have been compressed by using a format such as a Joint Photographic Experts Group (JPEG) format or an exchangeable image file format (Exif) and have been subjected to an image analysis. In addition, the examples of image files include moving images as well as still images.

The search section 17 searches the second storage section 16b for image files containing a photograph of the face of the communication partner. The first communication terminal 1 uses an application for transmitting and receiving image files between terminals. This application has the following functions:

A search function that adds attribute information to a phonebook/address book in the communication terminal and searches through image files, which have been subjected to an image analysis, on the basis of this information. In the present example, the attribute information includes an image of the face of the communication partner.

A transmitting and receiving function that adopts a high-speed short-range inter-device communication method and converts image files into a format suitable for the communication method in order to perform transmitting and receiving operations.

The image analysis is processing that identifies, for each image file, a target object or the like appearing in the image file, and is performed by the control section 13 when the second storage section 16b stores the image file.

The second storage section 16b stores image files captured by the imaging section 22 or image files downloaded through a network. The control section 13 extracts a face image portion of an object appearing in each image file. More specifically, the control section 13 extracts a face image portion of each individual appearing in an image file in which multiple individuals appear such as a group photograph. In a similar way, in the case where there is only one individual appearing in an image file, the control section 13 also extracts a face image portion of this individual.

The second storage section 16b is provided with a link information table (not shown) and the control section 13 registers the following information in the link information table.
1. An identification number assigned to each image file
2. An identification number assigned to each face image extracted from the image file
3. Link information for linking each face image with a corresponding user registered in the phonebook As the link information, the control section 13 registers information such as a physical address in the phonebook where personal information of the user is registered or a registration number of the user, the registration number being a serial number in the phonebook, is registered in the above-mentioned link information table. With this link information, the identification number of each face image of the communication partner registered in the phonebook/address book is linked to the identification number of a corresponding image file. This enables extraction, from the second storage section 16b, of image files containing images of the face of the communication partner selected from the phonebook/address book.

FIG. 7 illustrates an example of processing of image file transmission from the first communication terminal 1 to the second communication terminal 2.

<Registration of Face Image Information Containing Face Image of Communication Partner in Attribution Information of the Phonebook/Address Book>

The user who operates the first communication terminal 1 registers in advance face image information containing an image of the face of a communication partner necessary for searching in the phonebook/address book stored in the first storage section 16a.

<From Selection of Communication Partner to Searching of Image Files>

First, the user selects a communication partner from the phonebook/address book of the first communication terminal 1 while viewing the communication partner selection screen 45 displayed on the display section 14 (step S21). The search section 17 searches the second storage section 16b for image files, which have been subjected to image analysis, corresponding to the face image information of the communication partner which has been registered in advance (step S22).

Next, the search section 17 determines whether or not the corresponding image files exist in the second storage section 16b (step S23). If there are no corresponding image files, the processing is terminated. If there are corresponding image files, the retrieved image files are compressed and compiled into a single file to generate a compiled file (step S24).

<Transmission of Image Files>

Then, the user brings the first communication terminal 1 close to the second communication terminal 2 (step S25). Subsequently, the short-range communication section 23 determines whether or not the wireless communication channel 3 can be established with the second communication terminal 2 (step S26). If the short-range communication section 23 is not able to establish the wireless communication channel 3, the short-range communication section 23 terminates the transmission processing.

On the other hand, if the short-range communication section 23 establishes the wireless communication channel 3, the short-range communication section 23 transmits the compiled file by using inter-device communication (step S27). When the short-range communication section 23 completes the transmission of the compiled file, a message indicating that the transmission has been completed is displayed on the display section 14.

In this manner, the user of the first communication terminal 1 selects a communication partner from the phonebook/address book of the first communication terminal 1. With this selection as a trigger, the first communication terminal 1 searches for image files, which have been subjected to image analysis, corresponding to the registered face image information of the communication partner. After generating a compiled file, the first communication terminal 1 can transmit the compiled file to the second communication terminal 2. Therefore, there is an advantage in that the user does not have to search for individual image files in the first communication terminal 1 for the communication partner that uses the second communication terminal 2. There is another advantage in that an easier and faster operation for transmitting image files can be realized since searching of image files can be performed automatically in accordance with the face image information of the communication partner.

Alternatively, a recording medium on which program codes of software that implements the functions of the above-described embodiment may be supplied to a system or an apparatus. In such a case, it goes without saying that the functions of the above-described embodiment can be also achieved by reading and executing the program codes stored in the recording medium by using a computer (or a control device such as a central processing unit (CPU)) of the system or the apparatus.

Examples of such a recording medium that supplies the program codes in this case include a floppy disk, a hard disk, an optical disc, a magneto-optical disk, a compact disc read only memory (CD-ROM), a compact disc recordable (CD-R), a magnetic tape, a nonvolatile memory card, and a read-only memory (ROM).

The embodiment of the present invention includes not only the case where the functions of the above-described embodiment are achieved by executing the program codes read by the computer but also the case where the functions of the above-described embodiment are achieved by executing part of or the whole of actual processing on the basis of instructions of the program codes by using an operation system (OS) or the like that runs on the computer.

The present application contains subject matter related to that disclosed in Japanese Priority Patent Application JP 2009-054207 filed in the Japan Patent Office on Mar. 6, 2009, the entire content of which is hereby incorporated by reference.

It should be understood that the present invention is not limited to the above-described embodiment, and may be formed into various configurations within the scope of the present invention.

What is claimed is:
1. A communication terminal comprising:
a first storage section configured to store address information for performing connection to a communication terminal of a communication partner and an address book containing information about the communication partner;
a second storage section configured to store first data files;
a search section configured to search through the second storage section for first data files corresponding to the information about the communication partner linked to the communication terminal of the communication partner selected on the basis of the address book;

a compiling section configured to compile the retrieved first data files into a predetermined unit to generate a second data file; and a communication section configured to perform communication between the present communication terminal and the communication terminal of the communication partner and transmit the second data file to the communication terminal of the communication partner.

2. The communication terminal according to claim 1, wherein the communication section establishes a communication channel when the communication section recognizes that the present communication terminal has been brought close to the communication terminal of the communication partner, and transmits the second data file to the communication terminal of the communication partner.

3. The communication terminal according to claim 2, wherein the information about the communication partner stored in the address book is preference information of the communication partner using the communication terminal of the communication partner, wherein the first data files are music files having been subjected to sound quality analysis, and wherein the search section searches through the second storage section in accordance with the preference information of the communication partner.

4. The communication terminal according to claim 2, wherein the information about the communication partner stored in the address book is face information of the communication partner using the communication terminal of the communication partner, wherein the first data files are image files having been subjected to image analysis, and wherein the search section searches through the second storage section in accordance with the face information of the communication partner.

5. A transmission method performed by a communication terminal comprising the steps of:

searching through a second storage section configured to store first data files for first data files corresponding to information about a communication partner linked to a communication terminal of the communication partner selected from an address book, on the basis of an address book read from a first storage section configured to store address information for performing connection to the communication terminal of the communication partner and the address book containing information about the communication partner;

generating a second data file by compiling the retrieved first data files into a predetermined unit; and transmitting the second data file to the communication terminal of the communication partner by performing communication between the communication terminal and the communication terminal of the communication partner.

6. A transmission system comprising:

a first communication terminal; and a second communication terminal, wherein the first communication terminal includes a first storage section configured to store address information for performing connection to the second communication terminal and an address book containing information about the communication partner, a second storage section configured to store first data files, a search section configured to search through the second storage section for first data files corresponding to the information about the communication partner linked to the second communication terminal of the communication partner selected on the basis of the address book, a compiling section configured to compile the retrieved first data files into a predetermined unit to generate a second data file, and a first communication section configured to perform communication with the second communication terminal to transmit the second data file thereto, and wherein the second communication terminal includes a second communication section configured to perform communication with the first communication terminal to receive the second data file therefrom, and a restoration section configured to restore the first data files from the second data file.

* * * * *